US008235203B2

(12) United States Patent
Glisch et al.

(10) Patent No.: US 8,235,203 B2
(45) Date of Patent: Aug. 7, 2012

(54) WEIGHBELT FEEDER APPARATUS

(75) Inventors: Miro Glisch, Scarborough (CA); Mike Messenger, Peterborough (CA)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/938,100

(22) Filed: Nov. 2, 2010

(65) Prior Publication Data

US 2011/0100786 A1        May 5, 2011

(30) Foreign Application Priority Data

Nov. 3, 2009   (EP) ..................................... 09174948

(51) Int. Cl.
*B65G 21/08*        (2006.01)

(52) U.S. Cl. ..................................... 198/860.1; 177/119

(58) Field of Classification Search ............... 198/860.1, 198/861.1; 177/119, 145, 238, 244
See application file for complete search history.

(56) References Cited

U.S. PATENT DOCUMENTS

| 5,294,756 | A  | * | 3/1994  | Lauber et al.  | ................ 177/119 |
| 5,421,451 | A  | * | 6/1995  | Easton         | .............. 198/860.1 |
| 6,252,181 | B1 | * | 6/2001  | Fallas et al.  | ................ 177/119 |
| 7,114,615 | B1 | * | 10/2006 | Karpy          | .............. 198/860.1 |
| 7,267,223 | B2 | * | 9/2007  | Spoors         | .............. 198/860.1 |
| 7,307,225 | B2 |   | 12/2007 | Berger         |                         |
| 7,432,455 | B2 | * | 10/2008 | Berger et al.  | ................ 177/119 |
| 7,735,638 | B2 | * | 6/2010  | Hau et al.     | .............. 198/860.1 |
| 2005/0211534 | A1 |  | 9/2005 | Tefend         |                         |

FOREIGN PATENT DOCUMENTS

EP            0 332 299        9/1989

* cited by examiner

*Primary Examiner* — James R Bidwell
(74) *Attorney, Agent, or Firm* — Cozen O'Connor

(57) ABSTRACT

A weighbelt feeder comprising a pair of metallic side rails along which moves a conveyor belt for transporting a material across the apparatus. The apparatus further includes a plurality of sheet metal frames spaced longitudinally apart on the pair of metallic side rails for supporting a mechanical load on the side rails. Each of the plurality of sheet metal frames comprises a support arm and a plurality of cross-arms cantilevered on the support arm and extending between the pair of metallic side rails. The support arm is fixed to a first side rail of the pair of metallic side rails and the free end of at least one of the cross-arms is fixed to a second side rail of the pair of metallic side trails. The apparatus also includes a metallic outer structure supporting the plurality of sheet metal frames and binding the frames into a unitary rigid construction.

16 Claims, 5 Drawing Sheets ized solely for purposes of illustration and not as a definition of the limits of the invention.

WEIGHBELT FEEDER APPARATUS

BACKGROUND OF THE INVENTION

1. Field of the Invention

The present invention relates to industrial equipment and, more particularly, to a weighbelt feeder apparatus, such as a weighbelt feeder for use in industrial process control.

2. Description of the Related Art

Weighbelt feeders are used, especially in production flow lines, for continuous measurement of the throughput quantity or mass flow rate of a material being transported. Normally, a weighbelt feeder apparatus is placed in a flow or feed line and comprises a conveyor belt for carrying the material to be transported. The mass flow rate of the material is determined by measuring the mass of material on the belt at a particular instance in time and the speed of the belt. Flow control is obtained by either varying the flow speed of the material or the thickness of the layer of material transported over the weighbelt feeder.

Typically, in a weighbelt feeder apparatus, the conveyor belt moves along metallic side rails which also support mechanical components, such as the pulleys, bearings, shafts and ends of idlers upon which the belt moves. The mechanical load on the side rails is supported by steel frames, each including a horizontal cross-member upon which the rails are supported. In certain conventional current designs, the cross-members of the support frames are cantilevered to facilitate removal and replacement of seamless conveyor belts, while also supporting the middle area and mechanical components between the belt strands. However, in such conventional designs, a significant amount of time is still used to remove/replace the belt, which requires almost a complete disassembly of the top half of the apparatus to remove the skirt boards, cover panels and support posts.

In addition, weighbelt feeders are currently designed with steel frames constructed using standard sized steel sections, such as C-channel, square, round or rectangular hollow sections. Manufacturing the apparatus in such a case involves creating small welded assemblies that are bolted together to create the support frame. Here, there is a significant amount of time required to fabricate these small weldments and bolt them together for final assembly. Further, since such conventional designs use standard sections in common metric or imperial sizes, the availability of these components is dependent on the regional area of production. As a result, it is difficult to create a configurable global solution of the product. Further disadvantageously, it is also more difficult to configure a three-dimensional model of all the combinations and perform structural analyses efficiently in an effort to optimize the design of a support frame having such sections.

SUMMARY OF THE INVENTION

It is therefore an object of the present invention to provide an improved weighbelt feeder apparatus having a cantilevered support frame.

This and other objects and advantages are achieved by providing a weighbelt feeder apparatus in which the support frame is constructed using cantilevered sheet metal frames that allow a seamless belt to be installed or removed horizontally from the conveyor without obstruction. Advantageously, the disclosed embodiments of the invention containing sheet metal parts can be configured in any manufacturing region around the world and also enables efficient use of raw materials. The function of the outer structure is to tie the inner skeleton structure of the sheet metal frames together, thereby creating a rigid assembly that supports the tensile stress on the sheet metal frames, particularly during a belt removal/replacement process.

In a preferred embodiment, at least one of the frames is a planar E-shaped sheet metal frame having upper, middle and lower cross-arms cantilevered to the support arm, where the middle cross-arm is fixed to the second side rail and the free ends of the upper and lower cross-arms are fixed to the outer structure. This allows a manufacturer to fabricate the apparatus using only sheet metal in standard metric or imperial plate thicknesses as required for each particular application. Detailed structural analyses can be performed on a three-dimensional parametric computer model allowing the required sheet metal thicknesses to be chosen appropriately for each application.

In a further embodiment, the E-shaped frames comprise upper corner portions projecting out of the outer structure and having slots. This allows the apparatus to be lifted, for example, by a crane.

In one embodiment, the side rails comprise sheet metal plates comprising slots configured for nesting respective mating portions of the frames. This improves the alignment of the apparatus and the overall assembly time.

In an exemplary embodiment, the outer structure comprises a plurality of sheet metal plates fixed to the frames and forms an outer shell enclosing the frames. This embodiment advantageously guards the apparatus from pinch point hazards.

In a further embodiment, the apparatus further comprises an opening provided on the outer shell, where the opening is covered by a removable access panel contained within and integrated into the opening to allow maintenance and replacement of the belt.

In a preferred embodiment, mating portions of the frames and the outer structure and mating portions of the frames and the side rails are respectively welded to each other to provide the necessary strength to the joints.

In an exemplary embodiment, the apparatus includes a material inlet located at an upstream end of the apparatus, a drive pulley for moving the conveyor belt located at a downstream end of the apparatus, a driven pulley at the upstream end of the apparatus, and a plurality of idlers upon which the conveyor belt moves, where the plurality of sheet metal frames includes a first sheet metal frame located proximately upstream of the material inlet, a second sheet metal frame located proximately downstream of the inlet and a third sheet metal frame located between the drive pulley and the farthest downstream idler. Having the frames at the above locations effectively provides support for the load on the side rails at the drive end and driven end of the conveyor belt as well as at the inlet.

In a further embodiment, depending on the length of the side rails, the apparatus further includes one or more additional sheet metal frames located between the second and the third sheet metal frames to provide additional support.

In one embodiment, the apparatus further comprises a tie bolted to the free ends of each cross-arm for each of the frames during operation of the apparatus. The ties are bolted in place during operation of the machine to provide rigidity to the cantilevered frames, and can be removed from the open end of the frames during belt replacement.

A further aspect of the present invention includes a method for manufacturing the above-mentioned apparatus.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is further described hereinafter with reference to illustrated embodiments shown in the accompanying drawings, in which.

DETAILED DESCRIPTION OF THE PRESENTLY PREFERRED EMBODIMENTS

Embodiments of the inventive apparatus described herein below form part of a continuous material weight measurement system used, for example, in production flow lines. Such a system typically includes speed and weight sensing devices, an integrator and control device and a mechanical conveying device. In particular, the apparatus of the present invention forms part of the mechanical conveying device which carries the material to be transported over a conveyor belt. The speed and weight sensing device senses the belt speed and the belt load and the integrator device measures small incremental totals of weight per time to compute the total material flow rate.

The apparatus in accordance with the invention is generally referred to as a weighbelt feeder. Due to the nature of the environment in which a weighbelt feeder is used, and the fact that the belts are wear items, it is necessary to regularly inspect, maintain and clean them out as well as replace the belt periodically. The invention in accordance with the disclosed embodiments illustrated below would greatly reduce the amount of time required for maintenance while minimizing the downtime.

Figure 1:
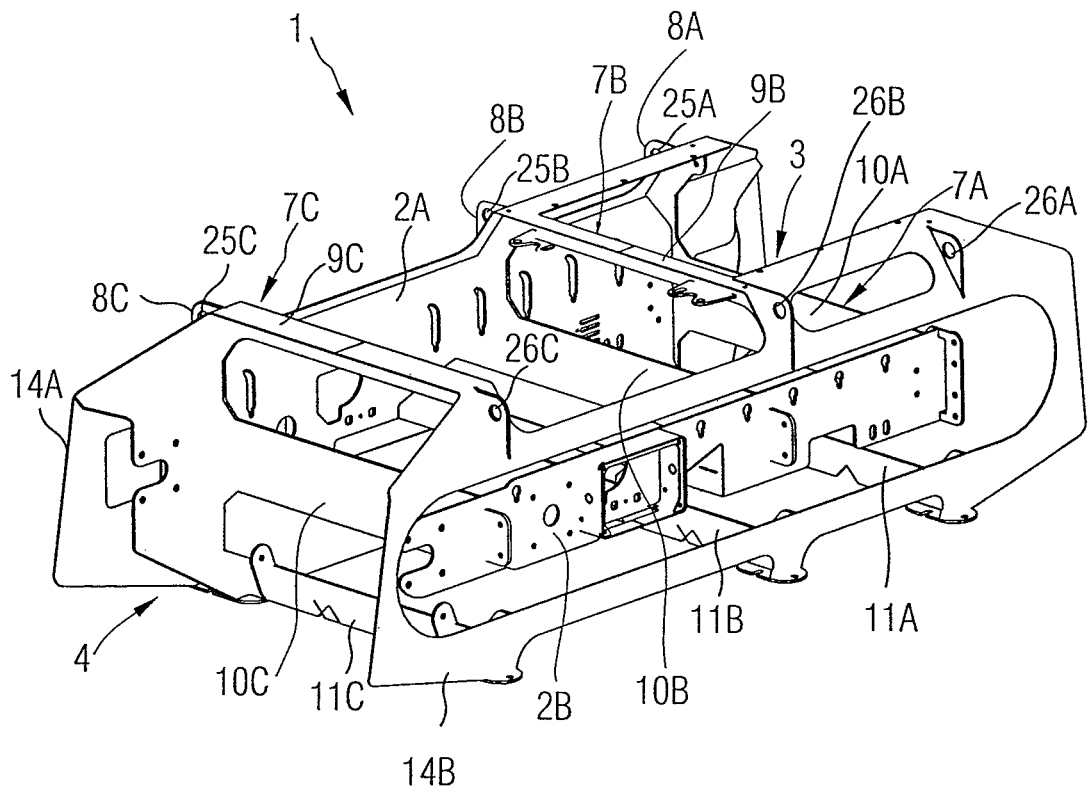
FIG. 1 is an illustration of a perspective view of a portion of a weighbelt feeder in accordance with an embodiment of the invention.

Referring to FIG. 1 illustrated therein is a portion of a weighbelt feeder apparatus 1 according to a first embodiment of the present invention. Parts of the apparatus 1 are better illustrated referring to a blown up view of the apparatus 1 shown in FIG. 3, in conjunction with FIG. 1. It should be appreciated that only parts of the apparatus 1 having relevance to the present invention have been depicted in the drawings. It should hence be appreciated by one skilled in the art that the apparatus 1 may include several components of known functionality, such as pulleys and idlers, as well as bearings, shaft, shear gate, plow, tracker, and load cells, among others, which have not been explicitly depicted in the drawings. As shown, the apparatus 1 includes a pair of metallic side rails or side plates 2A, 2B, along which moves a conveyor belt for transporting a material across the apparatus 1. The material enters from an inlet located at an upstream end 3 of the apparatus 1. The material entering from the inlet may be profiled by a mechanical shear gate, which fixes the correct material bed depth for a given particle size. A shear gate, however, is optional, and may not be necessary for some applications. Such an inlet, is known as a horse-shoe inlet.

Figure 2:
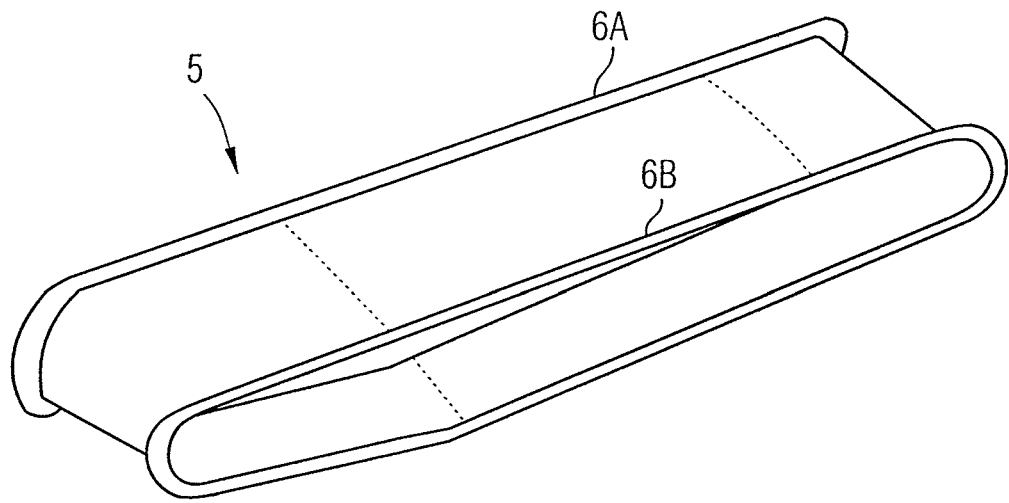
FIG. 2 is an illustration of a schematic block diagram of an exemplary seamless flanged belt that may be used in the apparatus in accordance with the disclosed embodiments of the invention.
Figure 6:
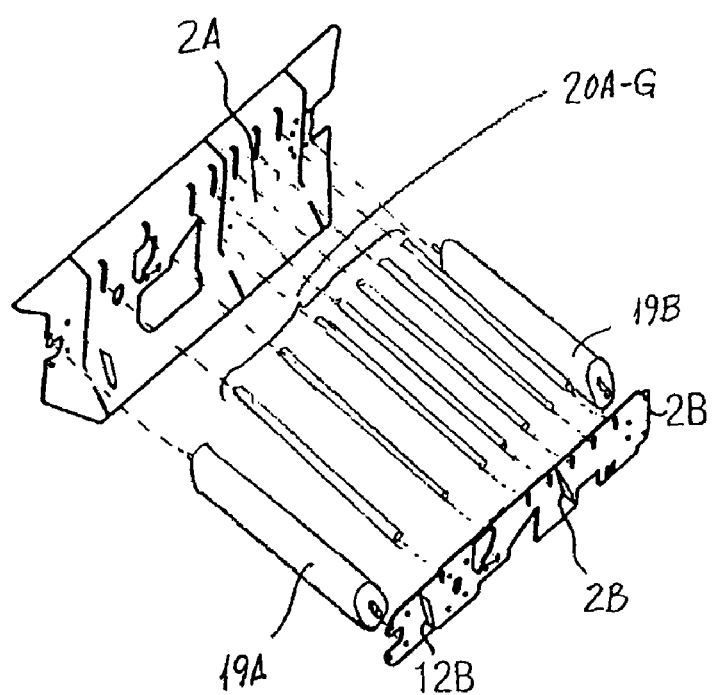
FIG. 6 is an illustration of exemplary drive pulleys and idlers for the seamless flanged belt of FIG. 2.

The material from the inlet is carried by the conveyor belt to a downstream end 4 of the apparatus 1, where it is discharged. The belt used in the present apparatus may include, for example, a seamless belt 5 having flanged edges 6A and 6B, as shown in FIG. 2. The belt is driven by a drive pulley 19A, typically located at the downstream end of the belt, and is carried by idlers 20A 20G disposed along the length of the side rails 2A, 2B (see FIG. 6). A drive pulley 19B or other support for the belt is disposed at the upstream end of the belt. The side rails 2A, 2B provide support for the drive pulley 19A and the ends of the idlers, as well as other mechanical components, such as the shafts, drive bearings, driven bearings, tracker, dynamic beam or load cell and its mountings (not shown for reasons of simplicity). During operation, the side rails 2A, 2B carry the belt tension loads transferred through the drive pulley 19A, shafts and bearings, as well as the bulk material loads transferred through the idlers 20A-20G.

Figure 3:
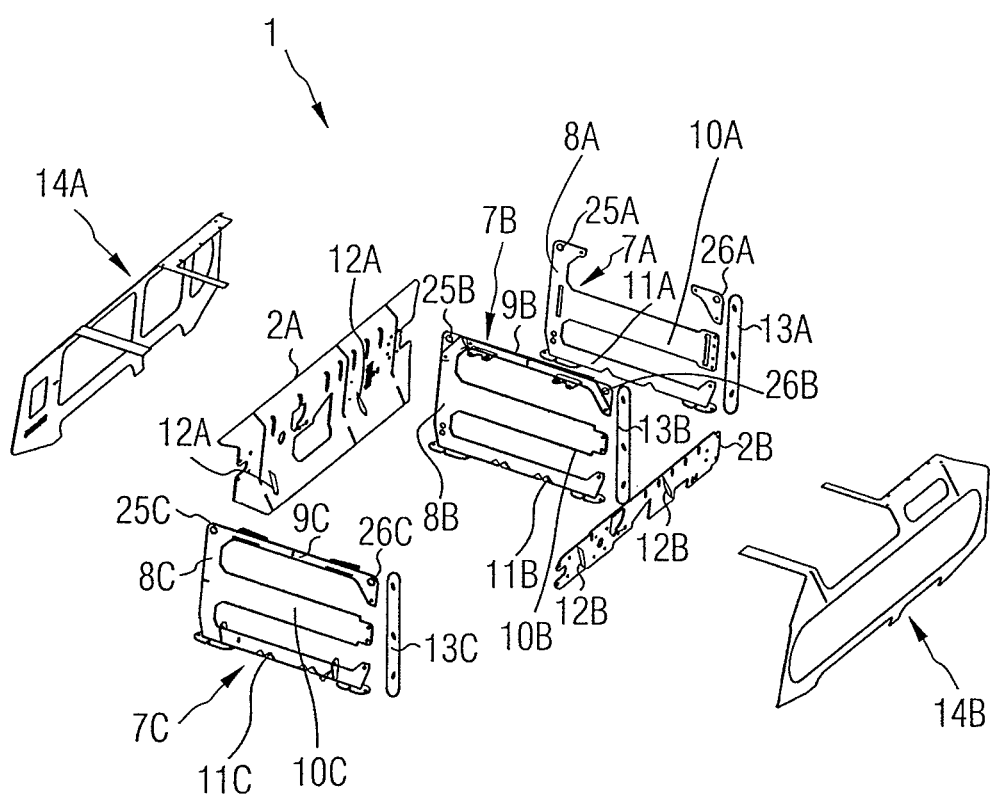
FIG. 3 is an illustration of an exploded view of the components of the apparatus of FIG. 1.

The load on the side rails 2A, 2B is supported by a plurality of longitudinally spaced apart support frames 7A, 7B, 7C fixed to the side rails 2A, 2B. In accordance with the present invention, the support frames are cantilevered and made from sheet metal. Each of the frames 7A, 7B, 7C includes a respective support arm 8A, 8B, 8C and a plurality of cross-arms 9B, 9C, 10A, 10B, 10C and 11A, 11B, 11C cantilevered on the support arm of the respective sheet metal frame. As shown in FIG. 3, each of the frames 7B, 7C is a planar E-shaped structure having three cross-arms 9B, 9C, 10B, 10C and 11B, 11C. In the presently contemplated embodiment, the frame 7A is provided with just two cross arms 10A, 11A for allowing access and maintenance of the material inlet. However, in principle, these frames may have any plurality of cross-arms. The support arms 8A, 8B, 8C of the sheet metal frames 7A, 7B, 7C are fixed to the first side rail 2A, which, for example, carries the weight of the motor, gearbox and electrical junction box. The cross-arms 9B, 9C, 10A, 10B, 10C and 11A, 11B, 11C extend between the side rails 2A, 2B and at least one cross-arm which, in this case, is the middle cross-arm 10B, 10C of the frames 7B, 7C respectively and the upper cross-arm 10A of the frame 7A, is fixed to the second side rail 2B at the free end of the respective cross-arm. The free ends of the upper cross-arms 9B, 9C and the lower cross-arms 11A, 11B, 110 may be fixed to the outer supporting structure or shell that is described below. The upper corners of the frames 7A, 7B, 7C may be provided with slots 25A, 25B, 25C and 26A, 26B, 26C, which would project out of the outer structure or shell, and used for lifting the apparatus, such as by a crane.

In the illustrated embodiment, the side rails 2A, 2B include sheet metal plates. To improve the alignment of the apparatus and to reduce the overall assembly time, each of these sheet metal side rails 2A, 2B respectively comprise one or more slots 12A and 12B (shown in FIG. 3) for nesting or keying respective mating portions of the frames 7A, 7B and 7C. Mating portions frames 7A, 7B, 7C and the side rails 2A and 2B are welded along the joints, such as by stitch welding, to provide the necessary stiffness. Alternately, mating portions of frames 7A, 7B, 7C and the side rails 2A, 2B may also be mechanically fastened to each other, such as, bolts.

The sheet metal frames 7A, 7B, 7C may be disposed at high load locations along the side 2A, 2B, which includes, for example, the drive end and the driven end of the belt. Accordingly, in an exemplary embodiment, the frame 7A may be located just upstream of the material inlet, the frame 7B may be located just past the inlet and the frame 7C may be located between the drive pulley and the last idler. Depending on the length of the side rails, additional frames be further disposed between the frames 7B, 7C for further supporting the load on the side rails.

During operation, the free ends of each sheet metal frame 7A, 7B and 7C are bolted to respective ties 13A, 13B, 13C (shown in FIG. 3). During a belt removal or replacement process, the ties 13A, 13B, 13C are removed, which allows a seamless belt to be installed or removed horizontally with from the apparatus.

In the illustrated embodiment, the apparatus 1 further includes a metallic outer structure, formed by sheet metal members 14A and 14B that are fixed the frames 7A, 7B, 7C, such as, by welding. The outer structure formed by the members 14A, 14B ties the inner skeleton of frames 7A, 7B, 7C in all directions, binding them into a rigid unitary construction. The members 14A, 14B absorb the outside tensile stresses induced on the cross-arms of the frames 7A, 7B, 7C when the ties 13A, 13B, 13C are removed for belt replacement. The metallic outer structure further provides a rigid assembly that can withstand stresses induced during operation and when the apparatus is lifted with a crane. Further, the proposed configuration ensures that the outer structure supports the material containment skirt boards, side rails and belt carrying components, because of which the effort from start to finish for a belt replacement is reduced in comparison to conventional designs. Likewise, the effort to re-assemble the apparatus to operational status is also decreased.

Figure 4:
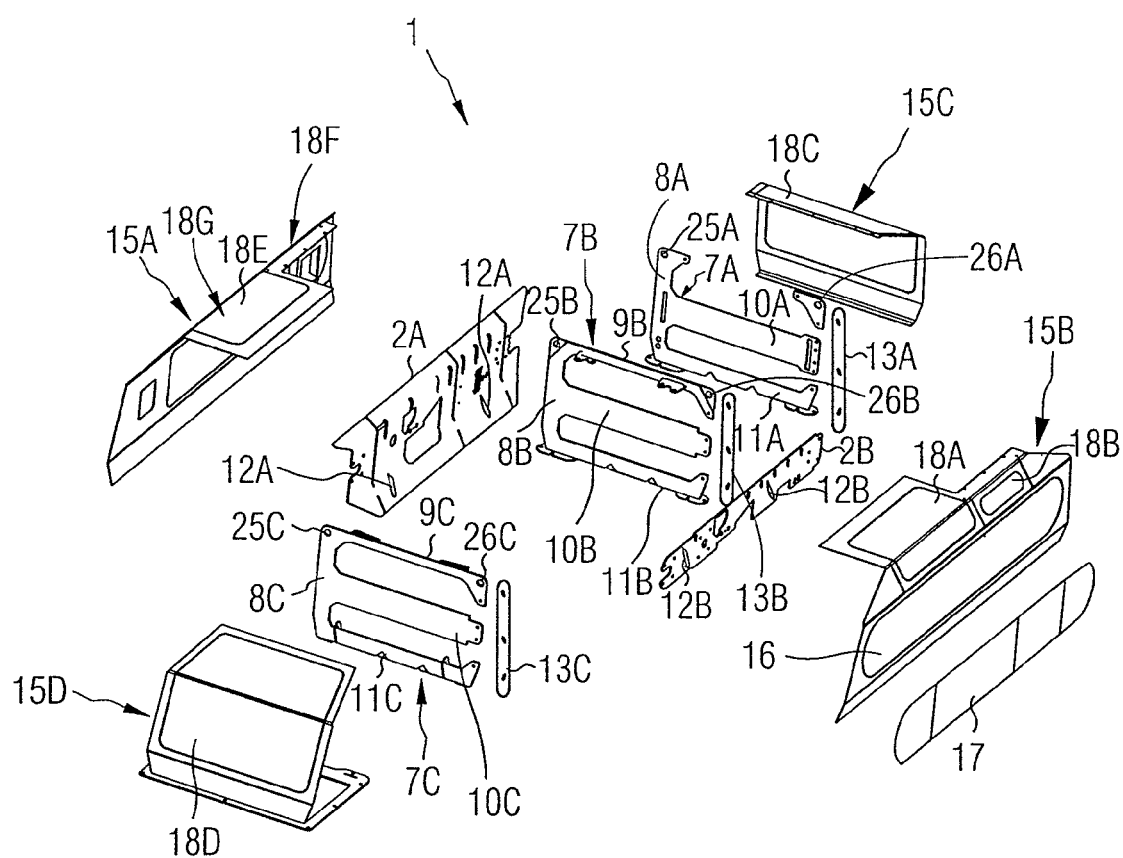
FIG. 4 is an illustration of an exploded view of the components of an enclosed type weighbelt feeder apparatus in accordance with an alternate embodiment of the invention.
Figure 5:
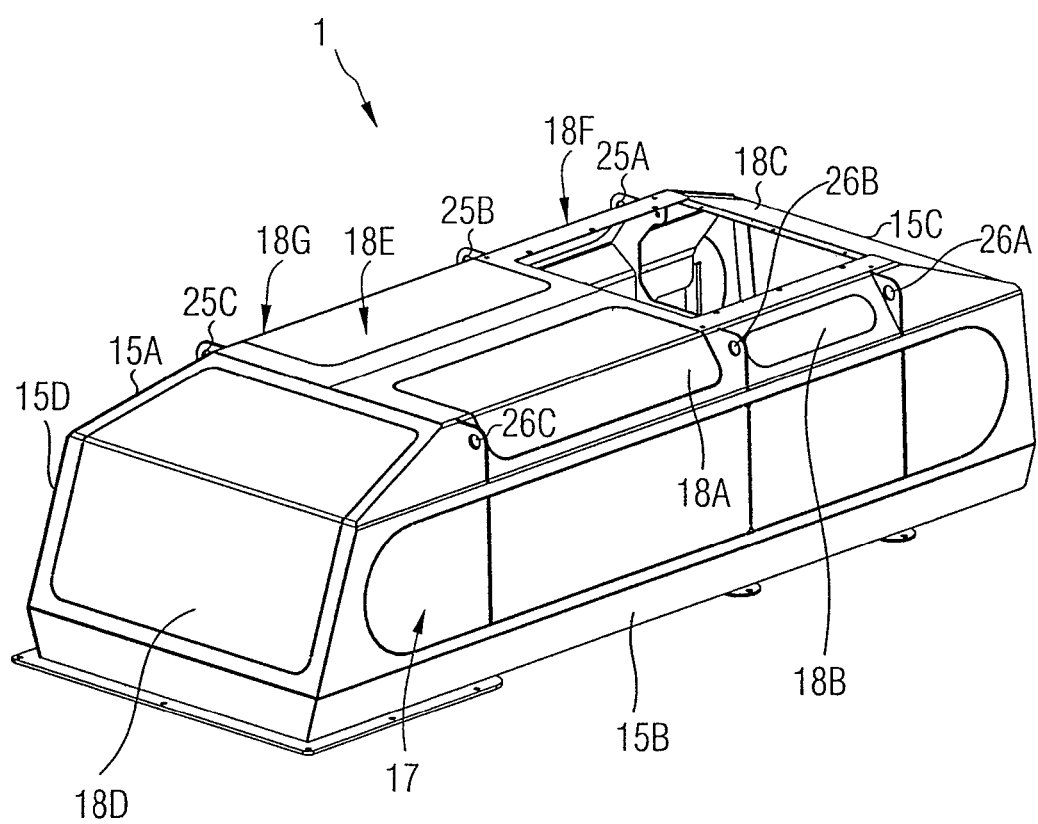
FIG. 5 is an illustration of a perspective view of the enclosed type weighbelt feeder apparatus after assembly.

A second embodiment of the present invention provides an enclosed type weighbelt feeder apparatus, as illustrated in FIGS. 4 and 5. For the sake of clarity and simplicity, parts of the apparatus shown in FIGS. 4 and 5 having correspondence to those of the apparatus shown in FIGS. 1 and 3 are represented by like reference numerals. Referring jointly to the exploded view in FIG. 4 and the assembled view in FIG. 5, the apparatus in accordance with the second embodiment includes an outer structure made of sheet metal plates 15A, 15B, 15C, 15D, instead of the sheet metal members 14A, 14B in the afore-described embodiment. The plates 15A, 15B, 15C, 15D are preferably made of thin gauge sheet metal and are fixed, such as by welding, to the inner frames 7A, 7B, 7C, to form an outer shell enclosing the apparatus, which provides complete guarding of the pinch points. Similarly to the earlier described embodiment, the sheet metal plates 15A, 15B, 15C, 15D tie the inner frames 7A, 7B, 7C in all directions to form a rigid unitary construction. The stresses on the outer edges of the frames 7A, 7B, 7C during belt replacement are absorbed by the thin gauge outer shell. During operation and lifting with a crane, the shell keeps the assembly rigid.

To provide access for belt replacement and maintenance, an opening 16 is provided in the plate 15B that is fixed to the free ends of the cross-arms of the frames 7A, 7B and 7C. The opening 16 is guarded by a cover or access panel 17 that is contained within and integrated to the opening 16 and connected, for example, by latches. During belt replacement, the access panel 17 is removed. Multiple such removable access panels 18A, 18B, 18C, 18D, 18E, 18F, 18G (panels 18F, 18G being located on the far side and hence not visible in FIGS. 4 and 5) may be further provided on the plates 15A, 15B, 15C, 15D to allow easy access to key areas of the apparatus quickly. The configuration of the contemplated embodiment involves efficient use of raw material and is advantageous over other conventional designs involving enclosed weighbelt feeders which require the panels to overlap with more complicated parts and are often an inefficient use of materials and fasteners. Further, the contemplated embodiment ensures that the outer shell supports the material containment skirt boards, side rails and belt carrying components, because of which the effort from start to finish for a belt replacement is reduced compared to conventional designs. Likewise, the effort to re-assemble the apparatus to operational status is also decreased.

Embodiments of the present invention described above present several advantages. For example, the aforementioned embodiments use only sheet metal parts allowing the manufacturer to choose standard metric or imperial plate thicknesses as required, without disturbing the general design arrangement. Also, the manufacturer is allowed to fabricate the apparatus using only the thicknesses of steel plate required for each particular application. Moreover, detailed structural analyses can be performed on a three-dimensional parametric computer model allowing the required plate thicknesses to be chosen appropriately for each application. This will minimize the amount of raw material used and ultimately lower the cost of manufacture. Furthermore, the units can be manufactured cost effectively in a region of choice, thereby lowering the cost of transportation and ultimately minimizing the purchase price to the customer. Further advantageously, the sheet metal parts used in the illustrated embodiments are cut such that they fit together closely and can be stitch welded along their joints to provide the necessary strength. The overall time to perform the welding and the bolting of loose parts is thus far less than that required in conventional designs.

The disclosed embodiments of the invention thus provide a weighbelt feeder apparatus that comprises a pair of metallic side rails, along which moves a conveyor belt for transporting a material across the apparatus. The apparatus further includes a plurality of sheet metal frames spaced longitudinally apart on the side rails for supporting a mechanical load on the side rails. Each of the frames comprises a support arm and a plurality of cross-arms cantilevered on the support arm and extending between the side rails. The support arm is fixed to a first side rail of the pair of metallic side rails and the free end of at least one of the cross-arms is fixed to a second side rail of the pair of metallic side rails. The apparatus also includes a metallic outer structure supporting the frames and binding these frames into a unitary rigid construction.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined by the below-mentioned patent claims.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A weighbelt feeder apparatus comprising:
a pair of metallic side rails, a conveyor belt moving along the pair of metallic side rails to transport a material across said apparatus;
a plurality of sheet metal frames spaced longitudinally apart on said pair of metallic side rails for supporting a mechanical load on said pair of side rails, each of said plural sheet metal frames comprising a support arm and a plurality of cross-arms cantilevered on said support arm and extending between said pair of metallic side rails, the support arm being fixed to a first side rail of said pair of metallic side rails and a free end of at least one of said plural cross-arms is fixed to a second side rail of said pair of metallic side rails, and
a metallic outer structure supporting said plural sheet metal frames and binding said plural sheet metal frames into a unitary rigid structure.

2. The apparatus according to claim 1, wherein at least one of said plural sheet metal frames is a planar E-shaped sheet metal frame having an upper cross-arm, a middle cross-arm and a lower cross-arm, each cross-arm being cantilevered to said support arm, wherein a free end of said middle cross-arm is fixed to a second of the pair of metallic side rails and free ends of the upper cross-arm and the lower cross-arm are fixed to said metallic outer structure.

3. The apparatus according claim 1, wherein said pair of metallic side rails comprise sheet metal plates comprising slots configured to nest respective mating portions of said plural sheet metal frames.

4. The apparatus according to claim 1, wherein said metallic outer structure comprises a plurality of sheet metal plates fixed to said plural sheet metal frames and forming an outer shell enclosing said plural sheet metal frames.

5. The apparatus according to claim 4, wherein said outer shell includes an opening which is covered by a removable access panel contained within and integrated into the opening.

6. The apparatus according to claim 1, wherein mating portions of each of said plural sheet metal frames and the outer metallic structure and mating portions of said plural sheet metal frames and the pair of metallic side rails are respectively welded to each other.

7. The apparatus according to claim 1, further comprising:
a material inlet located at an upstream end of the apparatus;
a drive pulley for moving said conveyor belt located at a downstream end of the apparatus;
a driven pulley at said upstream end of the apparatus; and
a plurality of idlers upon which the conveyor belt moves;
wherein said plural sheet metal frames include a first sheet metal frame located proximately upstream of the material inlet, a second sheet metal frame located proximately downstream of the material inlet and a third sheet metal frame located between the drive pulley and a most distal downstream idler.

8. The apparatus according to claim 7, further comprising:
at least one additional sheet metal frame located between said second and said third sheet metal frames.

9. The apparatus according to claim 7, further comprising:
a tie bolted to free ends of the cross-arms of said frames during operation of said apparatus.

10. The apparatus according to claim 2, wherein said E-shaped frame comprises upper corners projecting out of said outer structure and includes slots thereon.

11. A method for manufacturing a weighbelt feeder apparatus, comprising:
providing a pair of metallic side rails;
disposing a plurality of sheet metal frames spaced longitudinally apart on the pair of metallic side rails for supporting a mechanical load on the pair of metallic side rails, each of the plural sheet metal frames comprising a support arm and a plurality of cross-arms cantilevered on the support arm and extending between the pair of side rails, the support arm being fixed to a first side rail of the pair of metallic side rails and a free end of at least one of the cross-arms being fixed to a second side rail of the pair of metallic side rails; and
disposing a metallic outer structure supporting each of the plural sheet metal frames and binding each of the plural sheet metal frames into a unitary rigid structure.

12. The method according to claim 11, further comprising:
forming at least one of the plural sheet metal frames into a planar E-shaped sheet metal frame having an upper cross-arm, a middle cross-arm and a lower cross-arm, each cantilevered to the support arm;
wherein a free end of the middle cross-arm is fixed to the second side rail and free ends of the upper cross-arm and the lower cross-arm are fixed to the metallic outer structure.

13. The method according to claim 11, further comprising:
forming the pair of metallic side rails from sheet metal plates and providing slots on the pair of metallic side rails configured to nest respective mating portions of each of the plural metallic frames.

14. The method according to claim 12, further comprising:
forming the pair of metallic side rails from sheet metal plates and providing slots on the pair of metallic side rails configured to nest respective mating portions of each of the plural metallic frames.

15. The method according to claim 11, further comprising:
forming the outer structure from a plurality of sheet metal plates and affixing each of the plural sheet metal plates to the plural metallic frames to form an outer shell enclosing each of the plural metallic frames.

16. The method according to any of claim 11, further comprising:
welding respective mating portions of each of the plural metallic frames and the outer structure and mating portions of the plural metallic frames and the pair of metallic side rails.

* * * * *